(12) United States Patent
Medinei et al.

(10) Patent No.: US 11,598,870 B2
(45) Date of Patent: Mar. 7, 2023

(54) METHODS, SYSTEMS, AND APPARATUSES TO ESTIMATE HITCH ARTICULATION ANGLE (HAA) USING ULTRA-SONIC SENSORS (USS) AND FUSION WITH OTHER SENSORS

(71) Applicant: GM GLOBAL TECHNOLOGY OPERATIONS LLC, Detroit, MI (US)

(72) Inventors: Nojan Medinei, Toronto (CA); Joseph K. Moore, Whitby (CA); Halit Zengin, Courtice (CA); Anushya Viraliur Ponnuswami, Markham (CA); Rana M. Dastgir, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 104 days.

(21) Appl. No.: 17/196,910

(22) Filed: Mar. 9, 2021

(65) Prior Publication Data
US 2022/0291377 A1  Sep. 15, 2022

(51) Int. Cl.
*G01S 15/42* (2006.01)
*B62D 15/02* (2006.01)

(52) U.S. Cl.
CPC ............ *G01S 15/42* (2013.01); *B62D 15/021* (2013.01)

(58) Field of Classification Search
CPC ............... B62D 15/021; G01S 15/42
USPC .......................................... 702/151
See application file for complete search history.

(56) References Cited

U.S. PATENT DOCUMENTS 11,333,766 B2 * 5/2022 Kozak .................... G01S 17/931

OTHER PUBLICATIONS

Amin Habibnejad Korayem et al., Jul. 2022, IEEE Transactions on Intelligent Transportation Systems, vol. 23, No. 7, Jul. 2022, 7355-7546.*

* cited by examiner

*Primary Examiner* — Aditya S Bhat
(74) *Attorney, Agent, or Firm* — Lorenz & Kopf LLP

(57) ABSTRACT

In various embodiments, methods, systems, and vehicle apparatuses are provided. A method for estimating a Hitch Articulation Angle (HAA) using Ultra-Sonic Sensors (USSs) while ensuring quality detected echo signal performance using plausibility filtering, generating at least one set of USS data based on detecting a set of echo signals generated by a plurality of USSs configured about a vehicle coupled to a trailer; determining based on a set of USS data using a selected set of geometric equations in a plausibility filtering process for an arbitrary frontal shape of the trailer; and generating at least one comparison based on at least one set of USS data estimations to a kinematic model at low speeds for ensuring that results of the kinematic model to the HAA associated with the determined trailer shape is based on a pair of detected echo signals that are deemed to have a higher signal performance.

20 Claims, 7 Drawing Sheets

METHODS, SYSTEMS, AND APPARATUSES TO ESTIMATE HITCH ARTICULATION ANGLE (HAA) USING ULTRA-SONIC SENSORS (USS) AND FUSION WITH OTHER SENSORS

INTRODUCTION

The technical field generally relates to vehicle kinematic modeling systems, methods, and apparatuses and more particularly relates to systems, methods, and apparatuses for estimating Hitch Articulation Angle (HAA) using Ultra-Sonic Sensors (USSs) a kinematic model, and other sensor modalities to assess the signal quality and estimate Hitch Articulation Angle (HAA) of arbitrarily shaped trailer fronts during various trailering dynamic events in towing operations.

Autonomous, semi-autonomous and conventional vehicles can be designed to accommodate the towing or trailering of various loads, of trailers with different front ends that include without limitation: flatbeds, enclosed trailers, cargo hoppers, campers, boats, and sometimes other motorized vehicles. Also, a multitude of different trailer hitches is used in the trailering operations such as gooseneck hitches, weight distribution hitches, pintle hitches, receiver hitches, and 5th wheel hitches. Each configuration of trailer type and hitch type displays different vehicle dynamics. There are available, though limited, systems and devices to enhance both vehicle and trailer stability while performing a towing operation, however, given the multitude of combinations of trailers and hitches, there is no so-called one fit for all solution or even for that matter a solution that encompasses most or nearly all of the potential combinations of vehicle, trailers, and hitches that are in connected operation. Moreover, in an attempt to improve stability in this multitude of connected combinations, manufacturers have promoted rudimentary add-ons such as vehicle trim pieces, wind deflectors such as ground effects, which confer the vehicles with additional aerodynamic stability. Also, systems for traction control have been developed, as well as automatically-adjusting suspension systems that alter the height of the body of a vehicle in proportion to the weight of a load. Vehicles towing systems may still be improved in a number of respects.

Ultra-Sonic Sensors (USSs) have traditionally been used for Parking Assist features on vehicles. An Array of Ultra-Sonic Sensors (USSs) can be used for estimation of Hitch Articulation Angle (HAA) when towing trailers. However, the implementation of USSs has been limited in part because of practice obstacles such as high levels of interferences in signal reception noise, undesired reflections other than those from the trailer front such as reflections of the hitch point, and uncertain trailer shapes.

It is therefore desirable for methods, systems, and apparatuses that implement USSs with refinements in processing raw data, and additional layers of signal and logical filtering for at least accurate estimation of Hitch Articulation Angle (HAA) when towing trailers.

Furthermore, other desirable features and characteristics of the present invention will become apparent from the subsequent detailed description and the appended claims, taken in conjunction with the accompanying drawings and the foregoing technical field and background.

SUMMARY

A system, method, and apparatus for estimating Hitch Articulation Angle (HAA) using Ultra-Sonic Sensors (USSs) and a kinematic model to estimate Hitch Articulation Angle (HAA), and assessing the quality of the Ultra-Sonic Sensors (USS) signals by comparing the estimated HAA values using USS, kinematic, and other modalities, and then fusing with other sensor data for estimating Hitch Articulation Angles (HAAs) of arbitrarily shaped trailer fronts during various trailering dynamic events in towing operations are disclosed.

In one exemplary embodiment, a system including a processing unit disposed of in a vehicle including one or more processors configured by programming instructions encoded on non-transient computer-readable media is provided. The processing unit is configured to: generate at least one set of Ultra-sonic Sensor (USS) data based on detecting at least one set of echo signals generated by a plurality of USSs configured about the vehicle that has been directed at a trailer to determine a Hitch Articulation Angle (HAA) wherein the trailer is coupled to the vehicle; in response to detection of the at least one set of echo signals, filter based on at least one set of USS data based on plausibility filter assessments for quality of echo signals, and consistency with driving conditions including straight-ahead driving, and steering inputs of echo signals; in response to the filter of the at least one set of echo signals, estimate based on the at least one set of USS data by performing calculations using a selected set of geometric equations from one of a plurality of different sets of geometric equations in a plausibility filtering process to determine at least an arbitrary frontal shape of the trailer; classify the estimated arbitrary frontal shape of the trailer based at least on a comparison of measured distances from detected echo signals about the trailer to a determined trailer frontal shape; and generate at least one comparison based on at least one set of USS data estimated results to a kinematic model to ensure that results of the kinematic model to the HAA associated with the determined trailer frontal shape is deemed to have a higher signal performance wherein the higher signal performance is based on correlation with the kinematic model at low speeds.

In at least one exemplary embodiment, the system includes the processing unit configured to use plausibility filtering for the plurality of driving conditions that include at least straight-ahead driving, and steering angle consistency, and for a determination of the trailer frontal shape.

In at least one exemplary embodiment, the system includes the processing unit configured to: remove USS data inconsistent with the plurality of driving conditions including at least straight-ahead driving and steering angle input at low speeds; and classify trailer frontal shape for selecting geometric equations for determination of the HAA.

In at least one exemplary embodiment, the system includes the processing unit configured to use a set of measurements that include Steering Wheel Angle (SWA) or Road Wheel Angle (RWA) to determine a plausible range of acceptable distance measurements for reflections off the trailer frontal surface and USS echoes collected during the straight driving condition; and establish, based on SWA or RWA measurements, a set of plausible ranges with the removal of USS echoes that fall outside of an acceptable range of distance measurements.

In at least one exemplary embodiment, the system includes the processing unit configured to optimize the use of the USS data by comparing at least one set of USS data estimated HAA results to the kinematic model derived HAA results at low speeds that can provide a quality metric for an implemented process of USS HAA calculations with an associated determined trailer frontal shape.

In at least one exemplary embodiment, the system includes the processing unit configured to use a comparison at low speeds between the kinematic model derived HAA and the USS process HAA to determine a quality indicator for USS using a mean-square error calculation with sufficient data points based on an acceptable threshold.

In at least one exemplary embodiment, the system includes the processing unit configured to: use a comparison between the kinematic model derived HAA and the USS process HAA at conditions wherein the kinematic model is derived on assumptions that are deemed invalid based at least on a set of trailer dynamics including dynamics at higher speeds, at higher speeds with steering input, rough road surface conditions above a threshold acting on the vehicle and trailer, and crosswind conditions above a threshold acting on the vehicle and trailer, to determine the quality indicator for the kinematic model; fuse an HAA result from the USS process HAA and the kinematic model derived HAA with HAA results from multiple sensor modalities using a set of values which have been calculated for an HAA result and quality indicators which have been determined, wherein the multiple sensor modalities include at least vision, radar, and UWB modalities; and fuse the HAA result from the USS process HAA and associated quality indicator with HAA results from multiple sensor modalities and associated quality indicators, based on the kinematic model that is deemed a low quality; and fuse the HAA result from the USS process HAA and associated quality indicator with HAA results from multiple sensor modalities and associated quality indicators and the kinematic model derived HAA and associated quality indicator, based on the kinematic model that is deemed high quality.

In yet another exemplary embodiment, a method for estimating a Hitch Articulation Angle (HAA) using Ultra-Sonic Sensors (USSs) while ensuring quality detected echo signal performance using plausibility filtering, is provided. The method includes in response to coupling a trailer to a vehicle, generating at least one set of Ultra-sonic Sensor (USS) data based on detecting at least one set of echo signals generated by a plurality of USSs configured about the vehicle that has been directed at the trailer; in response to detection of the at least one set of echo signals, filtering based on at least one set of USS data by plausibility filtering assessments for quality of echo signals, and for consistency with a plurality of driving conditions including at least straight-ahead driving and with steering inputs of echo signals; in response to filtering of the at least one set of echo signals, estimating based on the at least one set of USS data by a performance of calculations using a selected set of geometric equations from one of a plurality of different sets of geometric equations in a plausibility filtering process to determine at least an arbitrary frontal shape of the trailer; classifying the estimated arbitrary frontal shape of the trailer based at least a comparison of measured distances from detected echo signals about the trailer to a determined trailer frontal shape; and generating at least one comparison based on at least one set of USS data estimated results to a kinematic model for ensuring that results of the kinematic model to the HAA associated with the determined trailer frontal shape is deemed to have a higher signal performance wherein the higher signal performance is based on correlation with the kinematic model at low speeds.

In at least one exemplary embodiment, the method includes using plausibility filtering for the plurality of driving conditions including at least straight-ahead driving, and steering angle consistency, and for a determination of the trailer frontal shape.

In at least one exemplary embodiment, the method includes removing USS data inconsistent with the plurality of driving conditions including at least straight-ahead driving and steering angle input at low speeds; and classifying trailer frontal shape for selecting geometric equations for determination of the HAA.

In at least one exemplary embodiment, the method includes using a set of measurements including Steering Wheel Angle (SWA) or Road Wheel Angle (RWA) to determine a plausible range of acceptable distance measurements for reflections off the trailer frontal surface and USS echoes collected during the straight driving condition; and establishing, based on SWA or RWA measurements, a set of plausible ranges with removing of USS echoes that fall outside of an acceptable range of distance measurements.

In at least one exemplary embodiment, the method includes optimizing the use of the USS data by comparison of at least one set of USS data estimated HAA results to the kinematic model derived HAA results at low speeds that can provide a quality metric for an implemented process of USS HAA calculations with an associated determined trailer frontal shape.

In at least one exemplary embodiment, the method includes using a comparison at low speeds between the kinematic model derived HAA and the USS process HAA to determine a quality indicator for USS using a mean-square error calculation with sufficient data points based on an acceptable threshold.

In at least one exemplary embodiment, the method includes using a comparison between the kinematic model derived HAA results and the USS process HAA at conditions wherein the kinematic model is derived on assumptions that are deemed invalid based at least on a set of trailer dynamics including dynamics at higher speeds, at higher speeds with steering input, at rough road surface conditions above a threshold acting on the vehicle and trailer, and crosswind conditions above a threshold acting on the vehicle and trailer, to determine the quality indicator for the kinematic model.

In at least one exemplary embodiment, the method includes fusing an HAA result from the USS process HAA and the kinematic model derived HAA with HAA results from multiple sensor modalities using a set of values which have been calculated for an HAA result and quality indicators that have been determined, wherein the multiple sensor modalities include at least vision, radar, and UWB modalities.

In at least one exemplary embodiment, the method includes fusing an HAA result from the USS process HAA and associated quality indicator with HAA results from multiple sensor modalities and associated quality indicators, based on the kinematic model that is deemed low quality.

In at least one exemplary embodiment, the method includes fusing the HAA result from the USS process HAA and associated quality indicator with HAA results from multiple sensor modalities and associated quality indicators and the kinematic model derived HAA and associated quality indicator, based on a kinematic model that is deemed high quality.

In at least one exemplary embodiment, the method includes implementing the kinematic model for assessing the quality of USS process HAA results from the USS measurements at lower speeds, while the USS process HAA results are used to assess quality of the kinematic model in a set of trailer dynamic conditions including at least dynamics at higher speeds, at higher speeds with steering input, at rough road surface conditions above a threshold acting on the vehicle and trailer, and crosswind conditions above a threshold acting on the vehicle and trailer.

In yet another exemplary embodiment, a vehicle apparatus, including a Hitch Articulation Angle (HAA) based on an estimation by an Ultra-Sonic Sensor's (USSs) estimation unit including one or more processors and non-transient computer-readable media encoded with programming instructions is provided. The USSs estimation unit is configured to: generate at least one set of Ultra-sonic Sensor (USS) data based on detecting at least one set of echo signals generated by a plurality of USSs configured about a vehicle that has been directed at a trailer wherein the trailer is coupled to the vehicle; in response to detection of the at least one set of echo signals, filter based on at least one set of USS data based on plausibility filter assessments for quality of echo signals, and consistency with driving conditions including straight-ahead driving and steering inputs of echo signals; in response to the filter of the at least one set of echo signals, estimate based on the at least one set of USS data by performing calculations using a selected set of geometric equations from one of a plurality of different sets of geometric equations in a plausibility filtering process to determine at least an arbitrary frontal shape of the trailer; classify the estimated arbitrary frontal shape of the trailer based at least on a comparison of measured distances from detected echo signals about the trailer to a determined trailer frontal shape; and generate at least one comparison based on at least one set of USS data estimated results to a kinematic model to ensure that results of the kinematic model to the HAA associated with the determined trailer frontal shape is deemed to have a higher signal performance wherein the higher signal performance is based on correlation with the kinematic model at low speeds.

In at least one exemplary embodiment, the vehicle apparatus includes the USSs estimation unit is configured to implement the kinematic model for assessing the quality of USS process HAA results from the USS measurements at lower speeds, while the USS process HAA results are used to assess quality of the kinematic model in a set of trailer dynamic conditions including at least dynamics at higher speeds, at higher speeds with steering input, at rough road surface conditions above a threshold acting on the vehicle and trailer, and crosswind conditions above a threshold acting on the vehicle and trailer.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
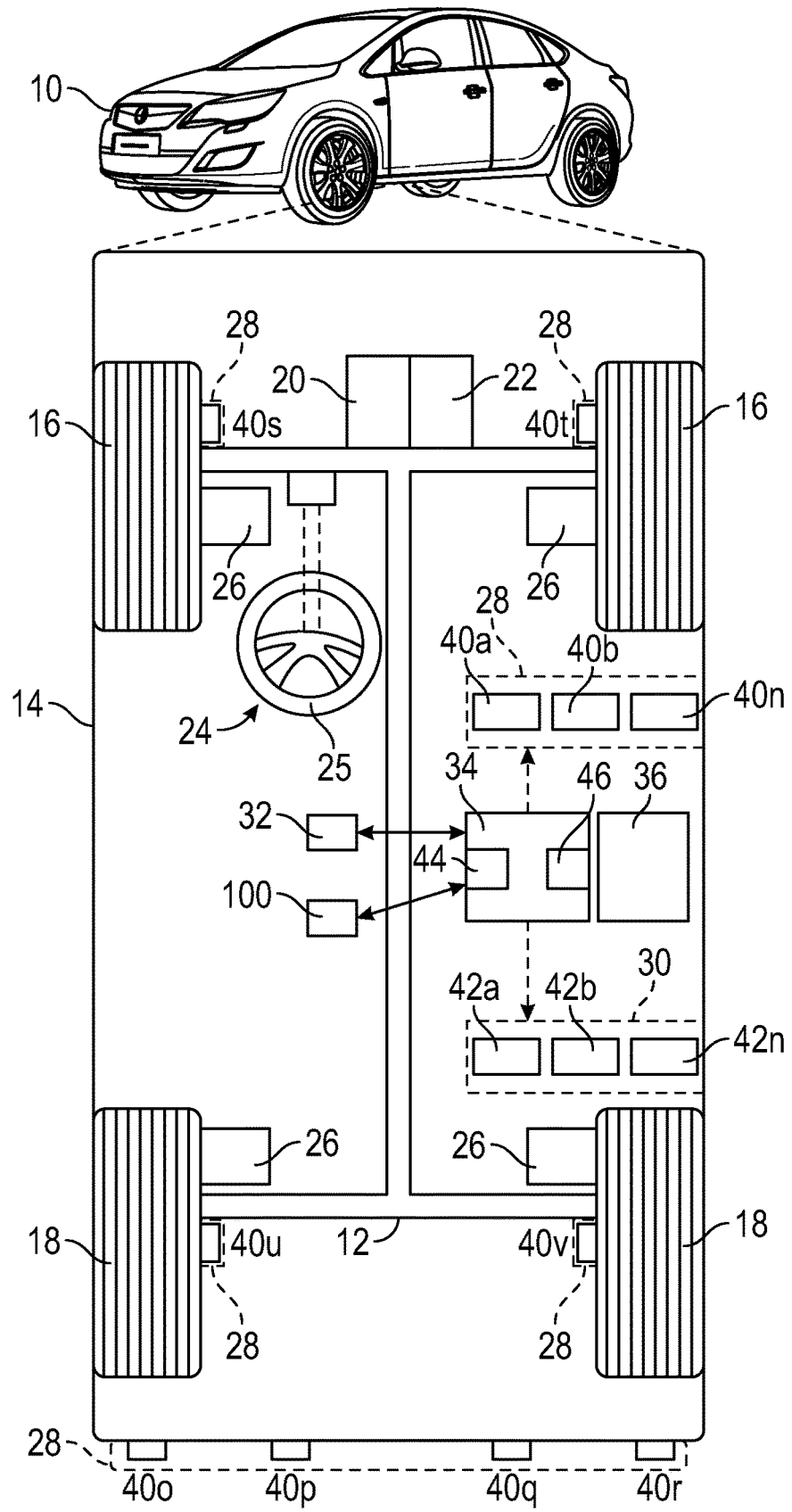
FIG. 1 illustrates a block diagram depicting an example vehicle that may include a processor that calculates Hitch Articulation Angles (HAAs) by detecting rear Ultra-Sonic Sensor (USS) echoes for any arbitrarily shaped trailer using echo switching and plausibility filters for distance modeling, steering angle consistency, and trailer frontal shape determinations, in accordance with an exemplary embodiment.

The following detailed description is merely exemplary in nature and is not intended to limit the application and uses. Furthermore, there is no intention to be bound by any expressed or implied theory presented in the preceding technical field, background, summary, or the following detailed description.

As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

Autonomous and semi-autonomous vehicles are capable of sensing their environment and navigating based on the sensed environment. Such vehicles sense their environment using multiple types of sensing devices such as optical cameras, radar, lidar, other image sensors, and the like. In such vehicles, the sensed data can be fused together with map data and vehicle sensors (inertial measurement unit, vehicle speed sensors, etc.) to identify and track vehicle trajectory tracking performance based on road geometry, as well as applicable in this disclosure for sensing data for kinematic modeling and for estimating Hitch Articulation Angle (HAA) for enhancing towing stability when towing a different shaped trailer.

In various exemplary embodiments, the present disclosure describes systems, methods, and apparatuses associating a 'Kinematic Model' with a trailer. The Kinematic Model describes relationships between the position, orientation, and motion of the vehicle and trailer.

In various exemplary embodiments, the present disclosure describes systems, methods, and apparatuses for estimating Hitch Articulation Angle (HAA) using Ultra-Sonic Sensors (USS) and a kinematic model, comparing with a kinematic model and other sensor data for at least assessing the quality of a kinematic model and then fusing with other sensor data and a kinematic model for estimating Hitch Articulation Angles (HAAs) of arbitrarily shaped trailer fronts during various trailering dynamic events in towing operations.

In various exemplary embodiments, the present disclosure describes systems, methods, and apparatuses to accurately estimate HAA using USS for an arbitrarily shaped trailer front by using enhanced sensor raw data, plausibility filtering, robust sensor pair selection, quality metric assessment for HAA using USS based on comparison with a kinematic model during low dynamic trailering events, quality metric assessment for a kinematic model based on a comparison with HAA using USS to assess the quality of the kinematic model during trailering high dynamic events, and then fusion of the estimated HAA using USS with a kinematic model (along with other sensor modalities) signals using quality metrics.

In various exemplary embodiments, the present disclosure describes systems, methods, and apparatuses that refines raw USS data filtering by omitting 'implausible' data points and by configuring a trailer kinematic model for use to further enhance the acceptance criteria for USS measurements. The method includes the assessment of sensor pairs' performance to select "winning" pairs and HAA angle quality and then uses the USS signals to evaluate the kinematic model quality during dynamic maneuvers to establish quality indicators for kinematic modeling and then fusing. In various exemplary embodiments, the present disclosure describes a methodology for estimating Hitch Articulation Angle (HAA) using Ultra-Sonic Sensors (USS) where USS data is processed and then passed through plausibility logic to (1) detect true trailer echoes from undesired reflections, (2) detect trailer shape, and (3) to make an initial assessment on which sensor pairs provide better information in order to calculate HAA from their echoes. The method includes geometric equations to calculate raw HAAs where each raw HAA from a sensor pair is compared against the kinematic model at low speeds and the pairs with higher performance (i.e. greater correlation with the kinematic model) are selected FIG. 1 illustrates a block diagram depicting an example vehicle that may include a processor that calculates HAA using rear USS echoes for any arbitrarily shaped trailer using echo switching and plausibility filters for straight-ahead driving, steering angle consistency, and trailer frontal shape determination, in accordance with an embodiment. The processor may be implemented using the Mean-Squared Error threshold to select the "winning" USS sensor pairs for an arbitrary trailer frontal shape. The processor utilizes a comparison at low speeds between a kinematic model and the USS method to devise a quality indicator for USS using Mean-Squared Error with sufficient data points based on an acceptance threshold. The processor uses a comparison at conditions where the kinematic model assumptions may not be valid (e.g. higher speeds with trailer dynamics or rough road conditions) between the kinematic model and USS method to devise a quality indicator for the kinematic model. The processor also fuses the USS and Kinematic model using methodologies known in the industry, such as Kalman filtering, (along with other sensor modalities, i.e., Vision, Radar, Ultra Wide Band (UWB), . . . ) using both the HAA calculated values (i.e., USS, Vision, Radar, UWB . . . ) and quality indicators as devised.

As depicted in FIG. 1, vehicle 10 generally includes a chassis 12, a body 14, front wheels 16, and rear wheels 18. The body 14 is arranged on chassis 12 and substantially encloses components of the vehicle 10. The body 14 and the chassis 12 may jointly form a frame. The vehicle wheels 16-18 are each rotationally coupled to the chassis 12 near a respective corner of the body 14. The vehicle 10 is depicted in the illustrated embodiment as a passenger car. Still, it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various exemplary embodiments, include friction brakes, brake by wire, a regenerative braking system such as an electric machine, and/or other appropriate braking systems.

The steering system 24 influences the position of the vehicle wheels 16 and/or 18. While depicted as including a steering wheel 25 for illustrative purposes, in some exemplary embodiments contemplated within the scope of the present disclosure, the steering system 24 may not include a steering wheel.

The sensor system 28 includes one or more sensing devices 40a-40v that sense observable conditions of the exterior environment and/or the interior environment of the vehicle 10 and generate sensor data relating thereto. The sensor system may include, but is not limited to, rear ultra-sonic sensors, rear vision sensors, rear radar sensors, vehicle speed sensors, and inertial measurement sensors.

The actuator system 30 includes one or more actuator devices 42a-42n that control one or more vehicle features such as, but not limited to, the propulsion system 20, the transmission system 22, the steering system 24, and the brake system 26. In various exemplary embodiments, the vehicle 10 may also include interior and/or exterior vehicle features not illustrated in FIG. 1, such as various doors, a trunk, and cabin features such as air, music, lighting, touch-screen display components, and the like.

The data storage device 32 stores data for use in controlling the vehicle 10. The data storage device 32 may be part of the controller 34, separate from the controller 34, or part of the controller 34 and part of a separate system.

The controller 34 includes at least one processor 44 (integrate with system 100 or connected to the system 100) and a computer-readable storage device or media 46. The processor 44 may be any custom-made or commercially available processor, a central processing unit (CPU), a graphics processing unit (GPU), an application-specific integrated circuit (ASIC) (e.g., a custom ASIC implementing a neural network), a field-programmable gate array (FPGA), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

For example, the system 100 may include any number of additional sub-modules embedded within the controller 34, which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
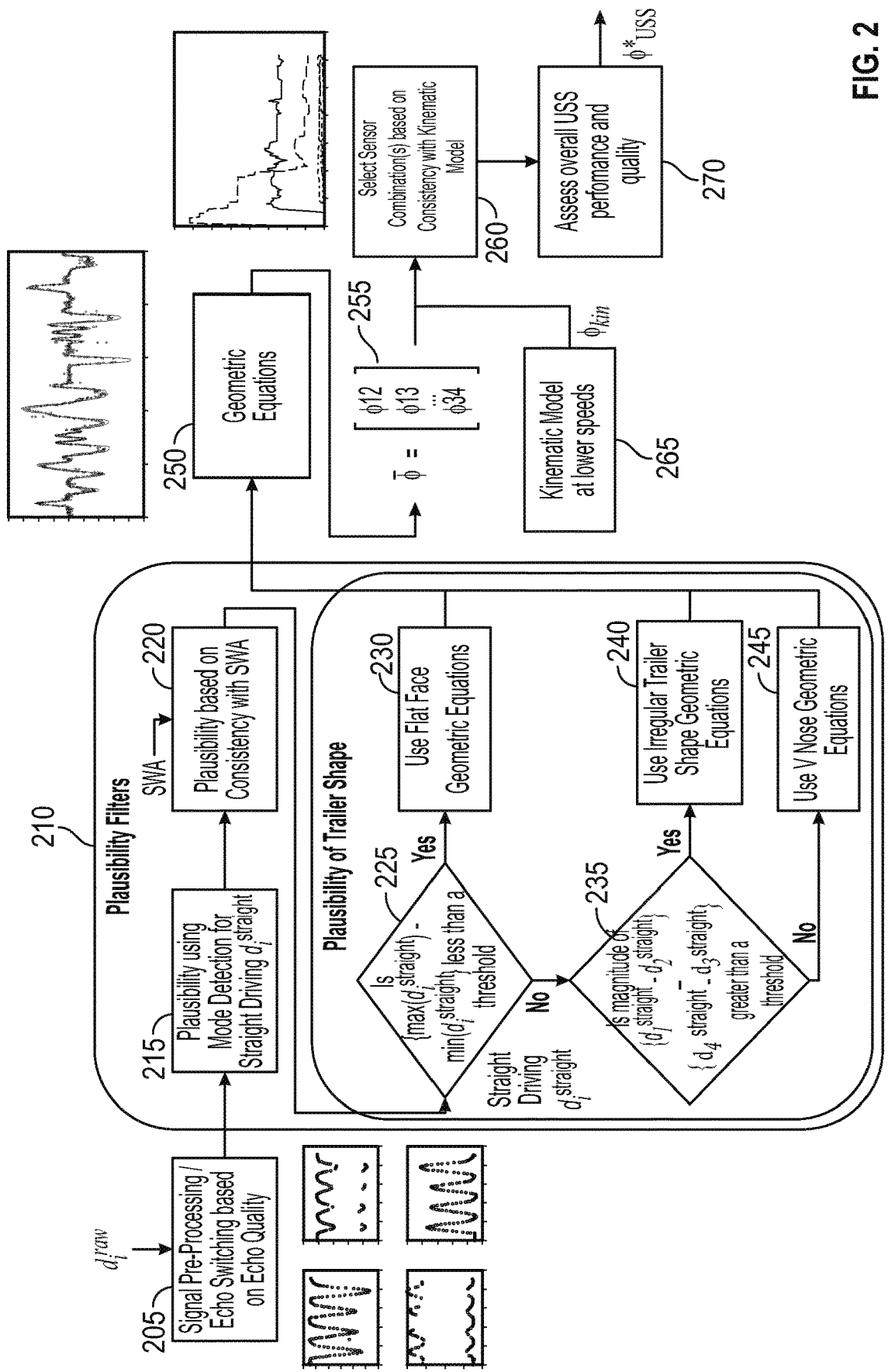
FIG. 2 illustrates an exemplary diagram of the method to accurately estimate HAA for any arbitrarily shaped trailer by an Estimate Hitch Articulation Angle (HAA) Using Ultra-Sonic Sensors (USS) system in conjunction with a kinematic model in accordance with an exemplary embodiment.

FIG. 2 illustrates an exemplary diagram of accurately estimate HAA for any arbitrarily shaped trailer by an Estimate Hitch Articulation Angle (HAA) Using Ultra-Sonic Sensors (USS) system in accordance with an exemplary embodiment.

FIG. 2 includes a process by system 100 (of FIG. 1) for a filtering system that includes a set of ultra-sonic sensor raw echo measurement data $d_i^{raw}$ (e.g., i=1,2,3,4 indicating the number of available USSs), for signal pre-processing and echo switching based on echo quality 205. The pre-processed set echo signal or driving data is then processed by a bank of plausibility filters 210 for robust directional (e.g., straight-ahead driving estimates) and acoustic filtration. For example, a set of plausibility filters 215 using the driving data for straight driving $d_i^{straight}$ which is used in part to establish a "base" for an acceptable range of measured distances and to filter out inconsistent time-varying measurement data. Once the output of straight driving 215 is known, the plausibility filter further refines the acceptance criteria for measurement points $d_i^{raw}$ by incorporating Steering Wheel Angle (SWA) or Road Wheel Angle (RWA). Given a known straight driving distance $d_i^{straight}$ for any individual sensor i, a clockwise increase in SWA input (box 220) would result in a corresponding increase or decrease in the actual physical distance between sensor i and the trailer front surface. Sensor data that does not meet this correspondence is removed. This knowledge further limits the boundaries of acceptance for reflections that are truly from the trailer surface and allows filtering out unwanted reflections, such as those from the hitch point.

An initial assessment of the shape of the trailer front is performed based on the difference between straight driving data $d_i^{straight}$ for different sensors. The plausibility of the trailer shape is determined at 225 by comparing whether the $\{max(d_i^{straight})\text{-min }(d_i^{straight})\}$ of a set of straight-ahead driving data $d_i$ is less than a threshold. If it is, then a set of flat face geometric equations at 230 are used to estimate Hitch Articulation Angle (HAA). If not, then another determination at 235 is performed which is to determine whether sensor data on the same side of the vehicle of a set of straight-ahead driving data $d_i$ is greater than a threshold (for the case of 4 symmetrically placed Ultra-Sonic Sensors). If the result is affirmative, then a set of irregular trailer shape geometric equations at 240 are used to estimate Hitch Articulation Angle (HAA). If not, then an assumption is made that the trailer is a V-Nose shaped trailer and at 245 a set of V-Nose geometric equations are used for the plausibility of the trailer shape.

Once the trailer shape is determined and unwanted USS data points are filtered out, the determined set of geometric equations 250 are used to calculate the Hitch Articulation Angle (HAA) $\phi_{i,j}$ by comparing the reported distance $d_i^{filtered}$ and $d_j^{straight}$ for sensors i and j. The geometric equations require the knowledge of the positions of the USS sensors on the vehicle in relation to the hitching point.

Depending on the determined set of geometric equations and availability of accepted USS distance measurements, $d_i^{filtered}$ at any time $t_k$, a maximum of 6 calculated HAAs (for the condition of 4 Ultra-Sonic Sensors) can be obtained at 255, as shown by a vector of $$\vec{\phi} = \begin{bmatrix} \phi_{12} \\ \phi_{13} \\ \ldots \\ \phi_{34} \end{bmatrix}.$$

At 265, the process optimizes the set of results by the use of the USS data by comparing the sensor estimated results to an independently calculated kinematic model $\phi_{kin}$ at lower speeds. The kinematic model $\phi_{kin}$ is implemented as a background application and the error term that is discovered is defined as the difference between the kinematic model $\phi_{kin}$ and USS equations that have been collected. The quality of estimations provided by each sensor pair output $\phi_{i,j}$ (or geometric equations) is processed at 260 based on consistency with the Kinematic model $\phi_{kin}$ in order to identify sensor pairs that perform better in their HAA estimations. Given the knowledge that sensors on one side of the vehicle may perform better in providing HAA estimations during instances when the trailer is physically positioned closer to those sensors, different performance bands of estimated $\phi_{i,j}$ versus $\phi_{kin}$ can be defined. As an example, a performance band for HAAs between [−20 deg, −10 deg] may show better estimation performance for $\phi_{i,j}$ calculated by comparing sensors on the right side of the vehicle, while the same sensors may have reduced performance in the opposite band of [+10 deg, +20 deg]. The Mean-Squared Error (MSE) between the $\phi_{kin}$ and $\phi_{i,j}$ at each different performance band can indicate the 'winning' pairs in that band.

Once winning pairs are selected in low-speed conditions, an average of available winning pair estimations at any time $t_k$ and any performance band is outputted as the HAA estimation $\phi_{USS}$ by USS process 260. The winning pair selection results in a more refined HAA estimation output than simply averaging all the available $\phi_{i,j}$ in $\bar{\phi}$ at time $t_k$. Once the process of identifying winning pairs in different estimation bands is finished, the HAA estimation output $\phi^*_{USS}$ is then processed at 270 to generate the 'overall' USS process performance and quality metrics.

Figure 3:
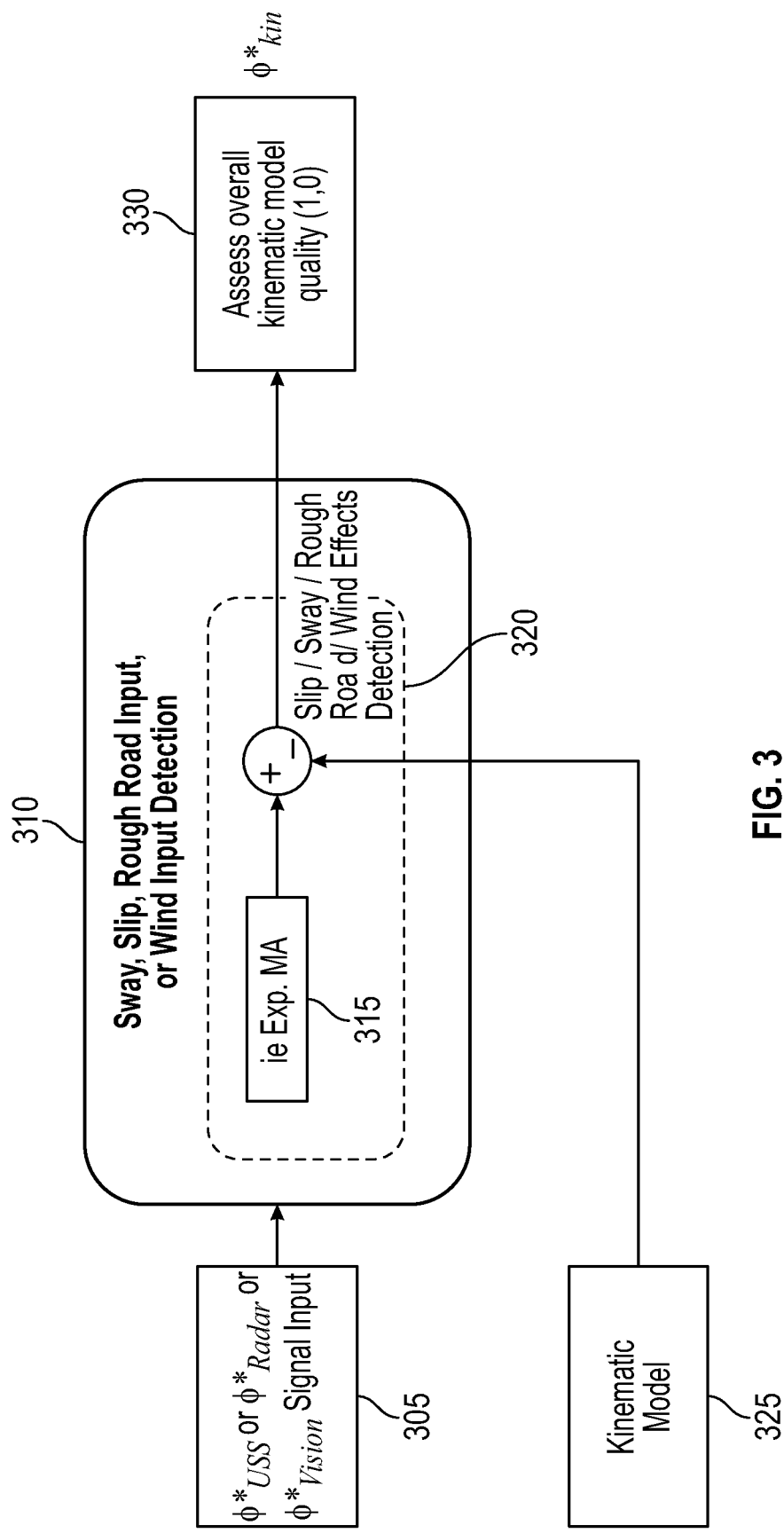
FIG. 3 illustrates an exemplary diagram of a quality assessment of the kinematic Model prior to Fusion by comparison to the Estimate Hitch Articulation Angle (HAA) Using Ultra-Sonic Sensors (USS) system in accordance with an exemplary embodiment.

FIG. 3 illustrates an exemplary diagram of a Quantitative Accuracy Assessment of the Kinematic Model prior to Fusion by the Estimate Hitch Articulation Angle (HAA) Using Ultra-Sonic Sensors (USS) system in accordance with an exemplary embodiment. In FIG. 3, the input 305 for performing the quality assessment of the kinematic model $\phi_{kin}$ may include multiple types of sensor input of USS $\phi^*_{USS}$, Radar $\phi^*_{Radar}$, and Camera $\phi^*_{Vision}$ signal input for calculations by the sway, side slip, rough road input, or wind input detection module(s) 310. The moving average 315 of the sensor input is independently calculated from the estimations of the kinematic model $\phi_{kin}$ 325. A deviation 320 from these two independent modalities of calculating the HAA allows for the detection of conditions in which the kinematic model fails, including side slip, sway, rough road, and wind effect above an acceptable threshold for the trailer. If the detection for the side slip, sway, rough road, and wind effect is determined above an acceptable threshold then a quality assessment 330 of the kinematic model (1,0) is determined $\phi^*_{kin}$.

In an exemplary embodiment, if speed determined is above an acceptable threshold attributed for the trailer sway based on a trailer sway detection criterion, the following assessment is made: The estimated Hitch Articulation Angle (HAA) Using Ultra-Sonic Sensors (USS) values is assessed using (i.e., exponential moving average or a bandpass filter for the frequency range of interest for trailer sway ie 0.5 to 4 Hz) the HAA signal from the USS (and/or other sensor modalities like vision, radar, UWB . . . ) to the kinematic model. If the difference between the kinematic model and (i.e., USSs) sensor values is greater than an acceptable threshold, then the potential for sway-induced effects is likely and the kinematic model quality assessment at 330 is set to 0.

In another exemplary embodiment, if the speed and the steering input is above an acceptable threshold for trailer side slip detection based on a trailer side slip detection criterion, the following assessment is made: The filter sensor is assessed using (i.e., exponential moving average) the HAA signal from the USS (and/or other sensor modalities like vision, radar, UWB . . . ) to the kinematic model. If the difference between the kinematic model and (i.e., USSs) sensor values is greater than a threshold, then the potential for side slip effect is likely and the result of the kinematic model quality assessment at 330 is set to 0.

In another exemplary embodiment, If the rough road wheel speed sensor algorithm generates a result above an acceptable threshold for rough road detection based on a rough road detection criterion, the following assessment is made: The filter sensor is assessed for statistical metric (ie standard deviation) of error between the HAA signal from the USSs (and/or other sensor modalities like vision, radar, UWB . . . ) and the kinematic model. If the statistical metric is greater than an acceptable threshold, then the potential for rough road input effect is likely and the result of the kinematic model quality assessment at 330 is set to 0.

In another exemplary embodiment, if the speed is above a threshold and crosswind is detected above an acceptable threshold the following assessment is made: The filter sensor is assessed using (i.e., exponential moving average) the HAA signal from the USS (and/or other sensor modalities like vision, radar, UWB . . . ) to the kinematic model. If the difference between the kinematic model and (i.e., USSs) sensor values is greater than the acceptable threshold, then the potential for wind input effect is likely and the result of the kinematic model quality assessment at 330 is set to 0.

Examples of techniques for detecting environmental crosswind conditions in a vehicle are described in U.S. Pat. No. 10,679,436 entitled "Vehicle suspension system alignment monitoring", issued on Jun. 9, 2020.

Figure 4:
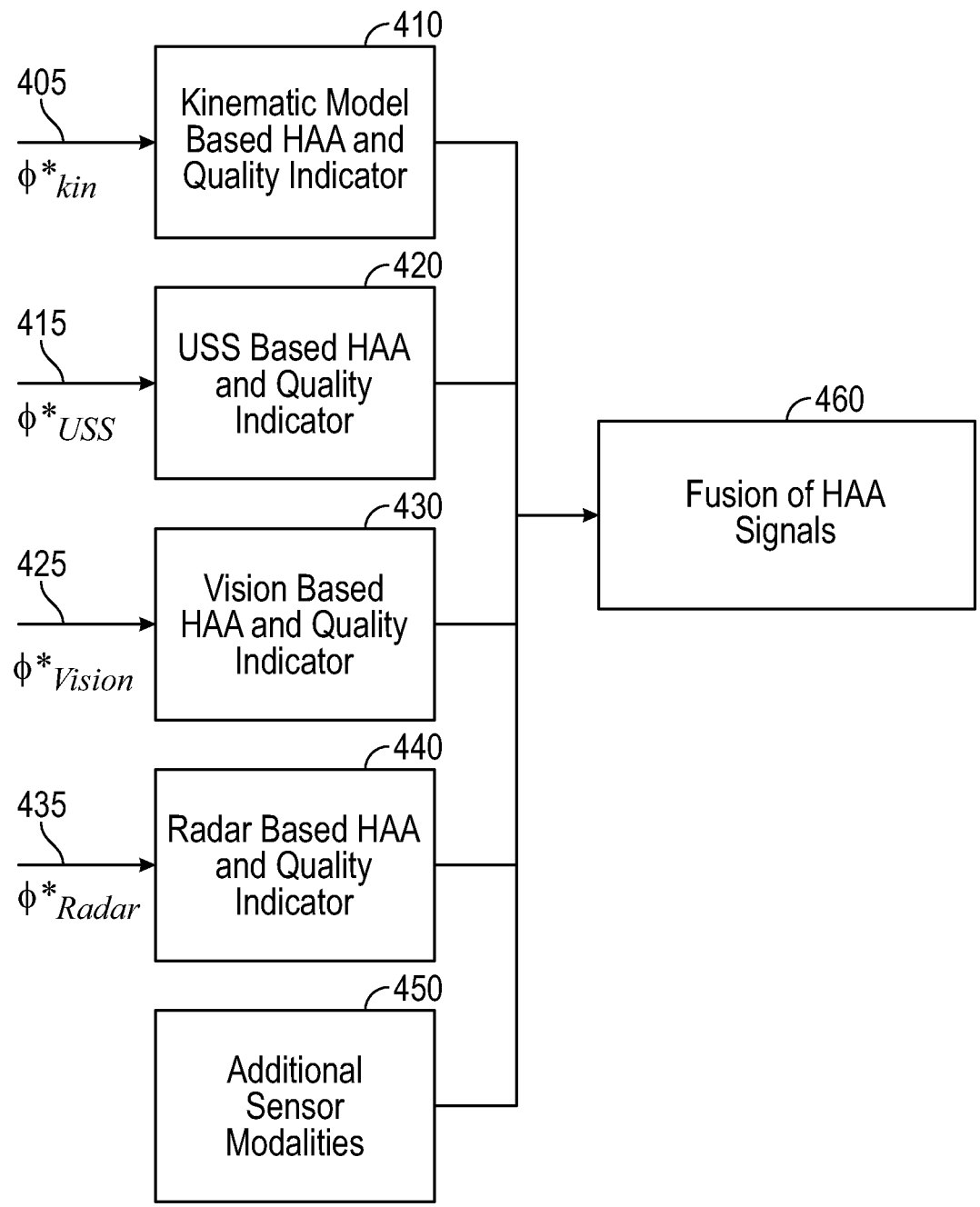
FIG. 4 illustrates an exemplary diagram providing for the fusion of USS data with kinematic model and/or other sensors and their respective quality assessments for estimating Hitch Articulation Angle (HAA) Using Ultra-Sonic Sensors (USS) system in accordance with an exemplary embodiment.

FIG. 4 illustrates an exemplary diagram providing for the fusion of USS data with kinematic model and/or other sensors by the Estimate Hitch Articulation Angle (HAA) Using Ultra-Sonic Sensors (USS) system in accordance with an exemplary embodiment. In FIG. 4, in an exemplary embodiment, the kinematic model is implemented, in a first instance to assess the quality of HAA from USS at lower speeds, and in a second instance, while the sensed data about the HAA from USS is used to assess the quality of kinematic model at dynamic conditions. The kinematic model quality is assessed based on separate operating conditions or a set of conditions logically separated in accordance with a set of acceptable thresholds described in FIG. 3.

As illustrated in FIG. 4, the HAA from USS (along with other sensor modalities like USS 415 $\phi^*_{USS}$, Vision (Camera) 425 $\phi^*_{vision}$, Radar 435 $\phi^*_{Radar}$, UWB (not shown), . . . ) and associated quality indicators are fused with the kinematic model 405 $\phi^*_{kin}$. For example, in FIG. 4 there is illustrated a multiplexed set of inputs that include the kinematic model based HAA and Quality indicator 410 $\phi^*_{kin}$, the USS based HAA and quality indicator 420 $\phi^*_{USS}$, the vision-based HAA and quality indicator $\phi^*_{kin}$ 430, the radar-based HAA and quality indicator 440 $\phi^*_{kin}$, and additional sensor modalities based HAA and quality indicator 450 that are combined or fused using various techniques such as Kalman filtering, Bayesian filtering, deep learning (i.e. CNN, RNN, etc), machine learning, etc for the fusion sensor processing at the fusion 460 of the HAA signals.

The fusion 460 of the HAA signals is executed in two related operating cases based on the quality of the kinematic model. In the first case, if (or when) the kinematic model $\phi^*_{kin}$ is deemed of low quality, the HAA from USS can be fused with other sensor modalities (like vision, radar, UWB, . . . if available) along with the associated quality indicators. In this case, the fused signal may then be simply reported out as a Moving Average. In a complementary second case, the fusion 460 takes place here based on a high-quality kinematic model: if the kinematic model is deemed high quality, the kinematic model may be fused with HAA from USS and other sensor modalities (like vision, radar, UWB, . . . if available) along with the associated quality indicators.

Figure 5:
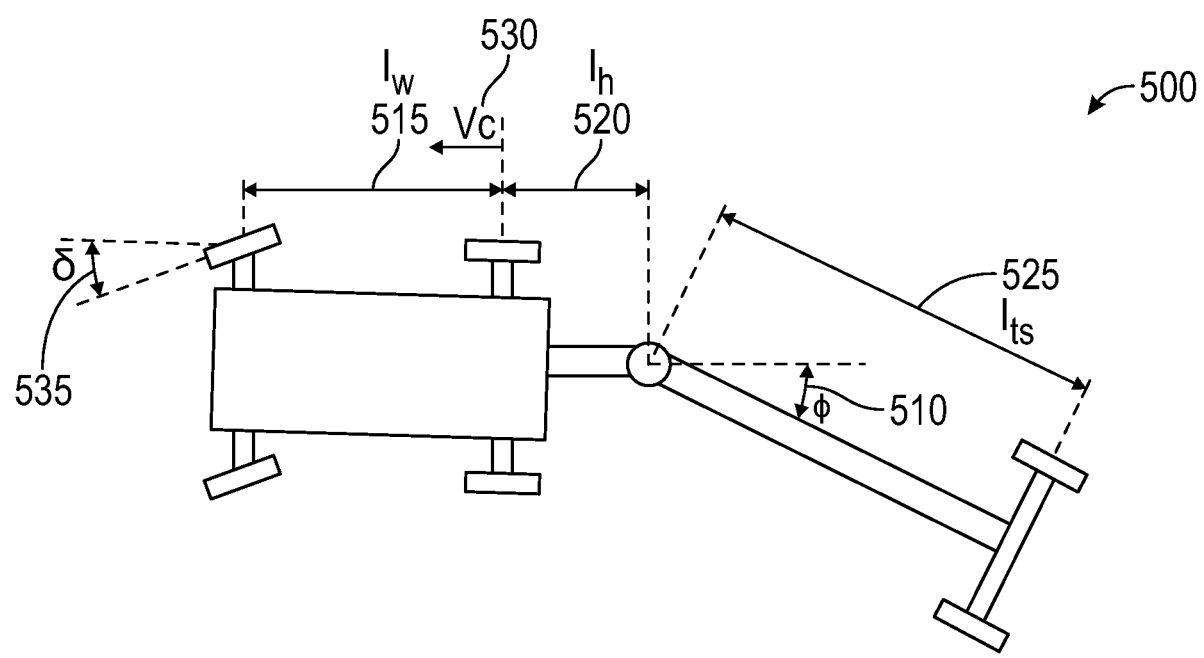
FIG. 5 illustrates an exemplary diagram of the vehicle and trailer arrangement and the Hitch Articulation Angle (HAA) detected by the Ultra-Sonic Sensors (USS) by the Estimate Hitch Articulation Angle (HAA) using Ultra-Sonic Sensors (USS) system in accordance with an exemplary embodiment.

FIG. 5 illustrates an exemplary diagram of the Hitch Articulation Angle (HAA) detected by the Ultra-Sonic Sensors (USS) by the Estimate Hitch Articulation Angle (HAA)

using Ultra-Sonic Sensors (USS) system in accordance with an exemplary embodiment. The HAA detected 510 "ϕ" in the vehicle-trailer 500 is calculated based on a set of measurements of the distance $l_w$ 515 of the vehicle's wheelbase, the distance $l_h$ 520 between the vehicle's rear axle and hitch point, the distance $l_{tr}$ 525 between the hitch point and the trailer's rear axle, and the angle δ 535 of the vehicle's road wheel angle. The equation to calculate 510 "ϕ" is as follows:

$$\dot{\phi} = -\frac{V_c}{l_{tr}}\sin\phi - \frac{V_c}{l_w}\tan\delta\left(\frac{l_h}{l_{tr}}\cos\phi + 1\right)$$

Where $V_c$ 530 is the vehicle's longitudinal speed, and δ 535 is the road wheel angle that is determined from the vehicle driver's steering angle input, and the kinematic model for the trailer is derived by the measurements $l_w$, $l_{tr}$, $l_h$ of the vehicle-trailer 500 over time t for calculations of the HAA (i.e., 510 "ϕ").

Figure 6:
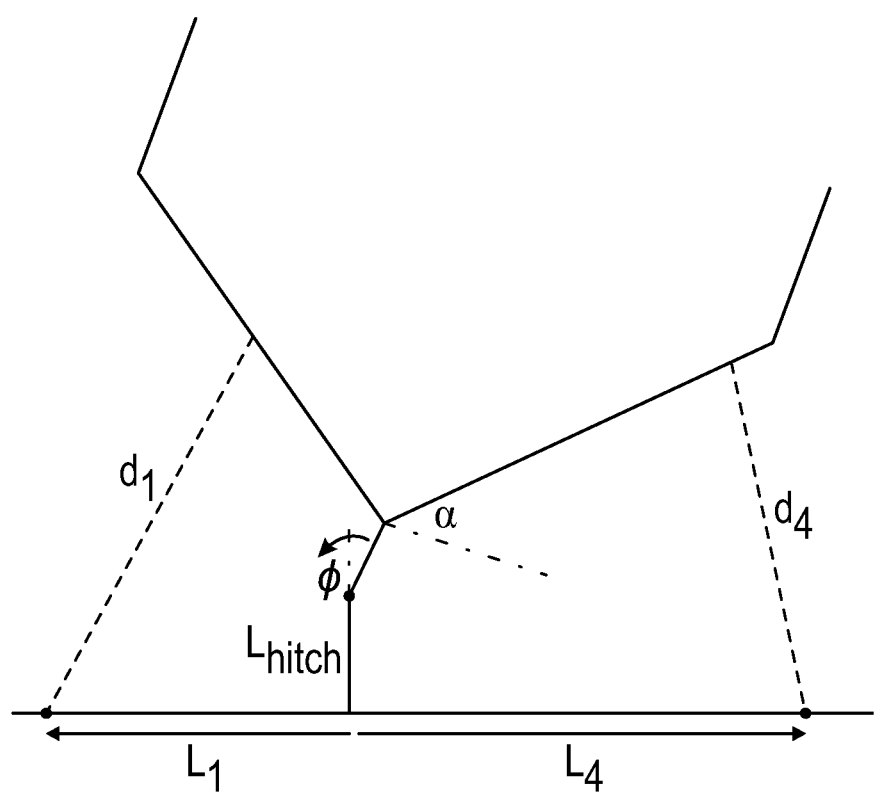
FIG. 6 illustrates an exemplary diagram of the geometric angles for the Hitch Articulation Angle (HAA) detected by the Ultra-Sonic Sensors (USS) by the Estimate Hitch Articulation Angle (HAA) using Ultra-Sonic Sensors (USS) system in accordance with an exemplary embodiment.

FIG. 6 illustrates an exemplary diagram of the geometric angles of the V-Nose trailer with a front face angle determined by the Estimate Hitch Articulation Angle (HAA) Using Ultra-Sonic Sensors (USS) system (HAA system) in accordance with an exemplary embodiment.

An example of the geometric equations, as illustrated by FIG. 6, is provided below:

$$\left[d_1 - \frac{L_{hitch}}{\cos(\phi+\alpha)} - (L_1 - L_{hitch}\tan(\phi+\alpha))\sin(\phi+\alpha)\right] -$$

$$\left[d_4 - \frac{L_{hitch}}{\cos(\phi+\alpha)} - (L_4 - L_{hitch}\tan(-\phi+\alpha))\sin(-\phi+\alpha)\right] = 0$$

where $d_1$ is the $d_1^{filtered}$ distance measured by sensor 1, and $d_4$ is $d_4^{filtered}$ distance measured by sensor 4, $L_{hitch}$ is the distance between vehicle bumper to the hitch point, $L_1$ is the distance between the vehicle bumper's middle point to sensor 1, $L_4$ is the distance between the vehicle bumper's middle point to sensor 4, and a is the face angle of the trailer front. This equation is numerically solved in order to obtain a value for the unknown HAA, denoted by ϕ.

Figure 7:
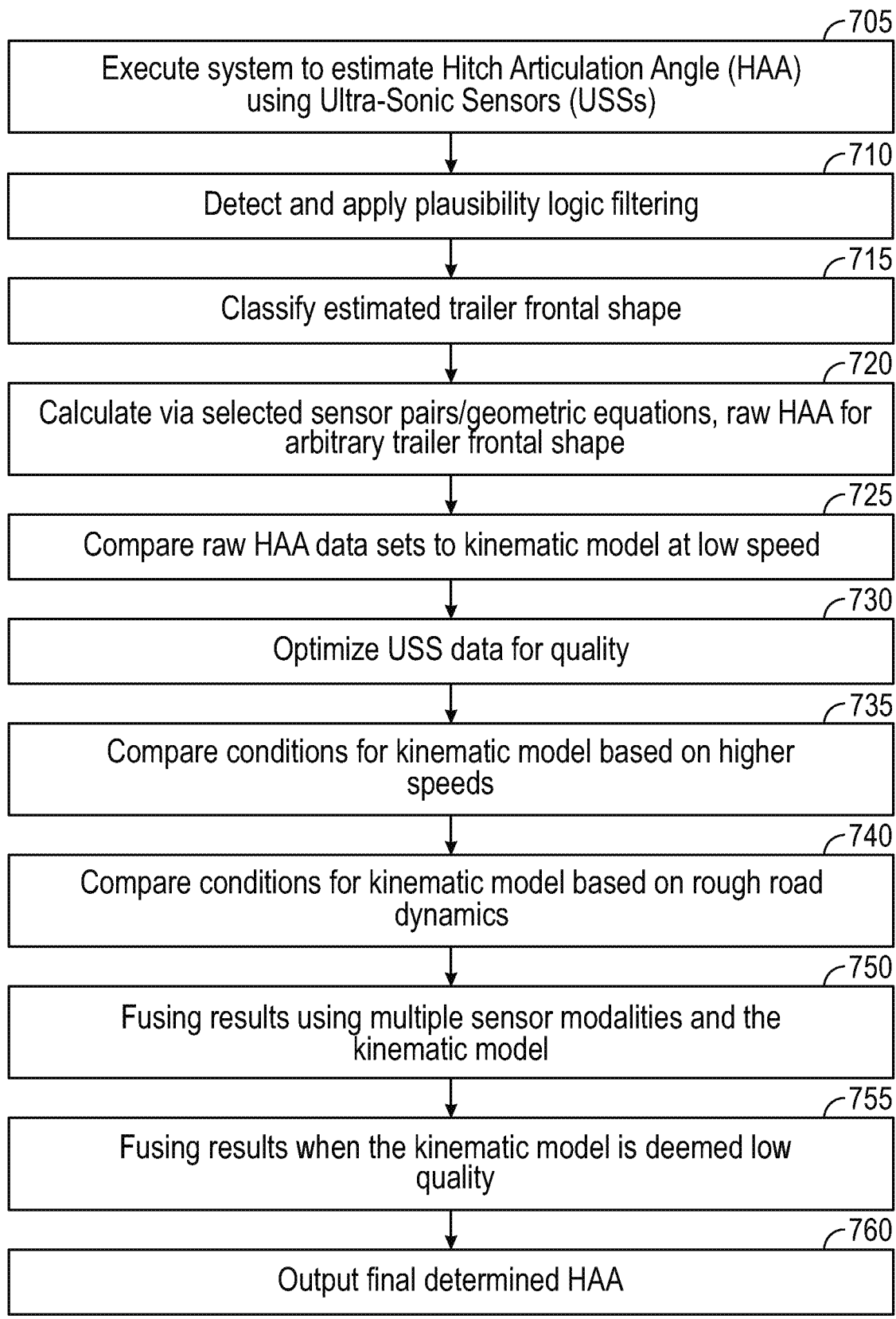
FIG. 7 illustrates an exemplary flowchart of a process for USS data processing, and then passing through plausibility logic by the Estimate Hitch Articulation Angle (HAA) Using Ultra-Sonic Sensors (USS) system in accordance with an exemplary embodiment.

FIG. 7 illustrates an exemplary flowchart of a process for USS data processing and then passing through plausibility logic by the Estimate Hitch Articulation Angle (HAA) Using Ultra-Sonic Sensors (USS) system (HAA system) in accordance with an exemplary embodiment.

Initially, the USS data is processed and then passed through plausibility logic to detect true trailer echoes from undesired reflections and detect trailer shape, to make an initial assessment on sensor pairs geometric equations, and to calculate raw HAAs. Each raw HAA from a sensor pair is compared against the kinematic model during low speeds, and those pairs with higher performance are selected.

At task 705, the system for estimating a Hitch Articulation Angle (HAA) using Ultra-Sonic Sensors (USSs) while ensuring quality detected echo signal performance using plausibility filtering is executed or triggered in response to coupling (or coupled state, or other similar action) of a trailer to a vehicle.

At task 710, a set of Ultra-sonic Sensor (USS) generates echo signals that provide USS data to the HAA system based on detection of the echo signals that have been directed at the trailer. The USS data is processed and then passed through plausibility logic to filter noise and identify true trailer echoes from undesired reflections, using collected data during straight driving and further enhances filtering noise by incorporating Steering Wheel Angle (SWA).

At task 715, the plausibility filter classifies the trailer frontal shape of an arbitrary trailer front end shape using data collected during straight driving. The plausibility filter logic compares the straight-ahead driving true echo signals against each other and determines the shape classification of the trailer.

At task 720, based on the shape classification of the trailer from task 715 for an arbitrary trailer front end shape, using data collected during straight driving, the plausibility filter makes initial assessments of which sensor pair combinations and corresponding geometric equations are to be selected in order to calculate HAA.

At task 725, the raw HAA sets from each sensor pair are compared against the kinematic model at low speeds. This is to ensure that the pairs of sensors which have been selected are those that exhibit qualities of higher performance. The comparison is based on a set of USS data estimated results $\phi_{i,j}$, from each selected sensor pair, compared to a kinematic model $\phi_{kin}$ during low speeds. The Mean-Squared Error (MSE) between the $\phi_{kin}$ and $\phi_{i,j}$ is used to select 'winning' pairs based on the comparison between $\phi_{kin}$ and $\phi_{i,j}$.

At task 730, the USS data use is further optimized by combining the results from the "winning" pairs to determine $\phi^*_{USS}$. The combination of the results from the winning pairs may be determined by multiple methods including an arithmetic average. This estimate Hitch Articulation Angle $\phi^*_{USS}$ is then compared to the estimated results of the kinematic model $\phi_{kin}$ at lower speeds to provide a quality metric for an implemented process of USS HAA calculations with an associated determined trailer shape. The comparison at low speeds between the kinematic model and the USS process to determine a quality indicator for USS can use multiple different types of algorithms to identify quality. For example, a Mean-Squared error calculation with sufficient data based on an acceptable threshold can be used.

At task 735, the comparison at conditions where the kinematic model is derived on assumptions that are deemed invalid based on trailer dynamics such as vehicle trailer speed above a certain threshold or vehicle speed and steering input above a certain threshold, between the kinematic model and the USS process to determine a quality indicator for the kinematic model. When the comparison exceeds a threshold, possible trailer sway or trailer side slip conditions may exist and the quality indicator for the kinematic model is assessed low quality and given a value of 0.

At task 740, the comparison is made at conditions where the kinematic model is derived on assumptions that are deemed invalid, based at least on rough road dynamics or crosswind conditions, between the kinematic model and the USS process to determine a quality indicator for the kinematic model. When the comparison exceeds a threshold, possible trailer motion due to a crosswind or rough road may exist and the quality indicator for the kinematic model is assessed low quality and given a value of 0.

At task 750, a fusing of the HAA result from the USS data can occur with multiple sensor modalities and the kinematic model when the kinematic model is deemed high quality. The HAA result is determined by the fusion of the USS data, multiple sensor modalities data and the kinematic model, and the associated quality indicators. The multiple sensor modalities may include vision, radar, and UWB modalities.

At task 755, the fusing of the HAA result from the USS data can occur with multiple sensor modalities and not the kinematic model based on the kinematic model deemed low quality. Here, again, the HAA result is determined by the fusion of the USS data, and multiple sensor modalities data, and the associated quality indicators. The multiple sensor modalities may include vision, radar, and UWB modalities.

At task 760, the final output of the HAA angle based on fusion is provided.

As mentioned briefly, the various modules and systems described above may be implemented in the HAA system for estimation step, kinematic modeling, and plausibility processing using one or more machine learning models that undergo supervised, unsupervised, semi-supervised, or reinforcement learning. Such models might be trained to perform classification (e.g., binary or multiclass classification), regression, clustering, dimensionality reduction, and/or such tasks. Examples of such models include, without limitation, artificial neural networks (ANN) (such as a recurrent neural network (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation-maximization, hierarchical clustering, etc.), and linear discriminant analysis models.

It should be appreciated that process of FIGS. 1-7 may include any number of additional or alternative tasks, the tasks shown in FIGS. 1-7 need not be performed in the illustrated order and process of the FIGS. 1-7 may be incorporated into a more comprehensive procedure or process having additional functionality not described in detail herein. Moreover, one or more of the tasks are shown in FIGS. 1-7 could be omitted from an embodiment of the process shown in FIGS. 1-7 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A system comprising:
    a processing unit disposed of in a vehicle comprising one or more processors configured by programming instructions encoded on non-transient computer-readable media, the processing unit configured to:
    generate at least one set of Ultra-sonic Sensor (USS) data based on detecting at least one set of echo signals generated by a plurality of USSs configured about the vehicle that has been directed at a trailer to determine a Hitch Articulation Angle (HAA) wherein the trailer is coupled to the vehicle;
    in response to detection of the at least one set of echo signals, filter based on at least one set of USS data based on plausibility filter assessments for quality of echo signals, and consistency with driving conditions comprising straight-ahead driving, and steering inputs of echo signals;
    in response to the filter of the at least one set of echo signals, estimate based on the at least one set of USS data by performing calculations using a selected set of geometric equations from one of a plurality of different sets of geometric equations in a plausibility filtering process to determine at least an arbitrary frontal shape of the trailer;
    classify the estimated arbitrary frontal shape of the trailer based at least on a comparison of measured distances from detected echo signals about the trailer to a determined trailer frontal shape; and
    generate at least one comparison based on at least one set of USS data estimated results to a kinematic model to ensure that results of the kinematic model to the HAA associated with the determined trailer frontal shape is deemed to have a higher signal performance wherein the higher signal performance is based on correlation with the kinematic model at low speeds.

2. The system of claim 1, further comprising:
    the processing unit configured to:
    use plausibility filtering for the plurality of driving conditions that comprise at least straight-ahead driving, and steering angle consistency, and for a determination of the trailer frontal shape.

3. The system of claim 2, further comprising:
    the processing unit configured to:
    remove USS data inconsistent with the plurality of driving conditions comprising at least straight-ahead driving and steering angle input at low speeds; and
    classify trailer frontal shape for selecting geometric equations for determination of the HAA.

4. The system of claim 3, further comprising:
    the processing unit configured to:
    use a set of measurements that comprise Steering Wheel Angle (SWA) or Road Wheel Angle (RWA) to determine a plausible range of acceptable distance measurements for reflections off the trailer frontal surface and USS echoes collected during the straight driving condition; and
    establish, based on SWA or RWA measurements, a set of plausible ranges with removal of USS echoes that fall outside of an acceptable range of distance measurements.

5. The system of claim 4, further comprising:
    the processing unit configured to:
    optimize the use of the USS data by comparing at least one set of USS data estimated HAA results to the kinematic model based on derived HAA results at low speeds that can provide a quality metric for an implemented process of USS HAA calculations with an associated determined trailer frontal shape.

6. The system of claim 5, further comprising:
    the processing unit configured to:
    use a comparison at low speeds between the kinematic model based on derived HAA results and the USS process HAA to determine a quality indicator for USS using a mean-square error calculation with sufficient data points based on an acceptable threshold.

7. The system of claim 6, further comprising:
the processing unit configured to:
use a comparison between the kinematic model derived HAA and the USS process HAA at conditions wherein the kinematic model is derived on assumptions that are deemed invalid based at least on a set of trailer dynamics comprising dynamics at higher speeds, at higher speeds with steering input, rough road surface conditions above a threshold acting on the vehicle and trailer, and crosswind conditions above a threshold acting on the vehicle and trailer, to determine the quality indicator for the kinematic model;
fuse an HAA result from the USS process HAA and the kinematic model derived HAA with HAA results from multiple sensor modalities using a set of values which have been calculated for an HAA result and quality indicators which have been determined, wherein the multiple sensor modalities comprise at least vision, radar, and UWB modalities;
fuse the HAA result from the USS process HAA and associated quality indicator with HAA results from multiple sensor modalities and associated quality indicators, based on the kinematic model that is deemed a low quality; and
fuse the HAA result from the USS process HAA and associated quality indicator with HAA results from multiple sensor modalities and associated quality indicators and the kinematic model derived HAA and associated quality indicator, based on the kinematic model that is deemed high quality.

8. A method for estimating a Hitch Articulation Angle (HAA) using Ultra-Sonic Sensors (USSs) while ensuring quality detected echo signal performance using plausibility filtering, comprising:
in response to coupling a trailer to a vehicle, generating at least one set of Ultra-sonic Sensor (USS) data based on detecting at least one set of echo signals generated by a plurality of USSs configured about the vehicle that has been directed at the trailer;
in response to detection of the at least one set of echo signals, filtering based on at least one set of USS data by plausibility filtering assessments for quality of echo signals, and for consistency with a plurality of driving conditions comprising at least straight-ahead driving and with steering inputs of echo signals;
in response to filtering of the at least one set of echo signals, estimating based on the at least one set of USS data by a performance of calculations using a selected set of geometric equations from one of a plurality of different sets of geometric equations in a plausibility filtering process to determine at least an arbitrary frontal shape of the trailer;
classifying the estimated arbitrary frontal shape of the trailer based at least a comparison of measured distances from detected echo signals about the trailer to a determined trailer frontal shape; and
generating at least one comparison based on at least one set of USS data estimated results to a kinematic model for ensuring that results of the kinematic model to the HAA associated with the determined trailer frontal shape is deemed to have a higher signal performance wherein the higher signal performance is based on correlation with the kinematic model at low speeds.

9. The method of claim 8, further comprising
using plausibility filtering for the plurality of driving conditions comprising at least straight-ahead driving, and steering angle consistency, and for a determination of the trailer frontal shape.

10. The method of claim 9, further comprising
removing USS data inconsistent with the plurality of driving conditions comprising at least straight-ahead driving and steering angle input at low speeds; and classifying trailer frontal shape for selecting geometric equations for determination of the HAA.

11. The method of claim 10, further comprising
using a set of measurements comprising Steering Wheel Angle (SWA) or Road Wheel Angle (RWA) to determine a plausible range of acceptable distance measurements for reflections off the trailer frontal surface and USS echoes collected during the straight driving condition; and
establishing, based on SWA or RWA measurements, a set of plausible ranges with removing of USS echoes that fall outside of an acceptable range of distance measurements.

12. The method of claim 11, further comprising
optimizing a use of the USS data by comparison of at least one set of USS data estimated HAA results to the kinematic model based on derived HAA results at low speeds that can provide a quality metric for an implemented process of USS HAA calculations with an associated determined trailer frontal shape.

13. The method of claim 12, further comprising:
using a comparison at low speeds between the kinematic model derived HAA and the USS process HAA to determine a quality indicator for USS using a mean-square error calculation with sufficient data points based on an acceptable threshold.

14. The method of claim 13, further comprising:
using a comparison between the kinematic model based on derived HAA results and the USS process HAA at conditions wherein the kinematic model is derived on assumptions that are deemed invalid based at least on a set of trailer dynamics comprising dynamics at higher speeds, at higher speeds with steering input, at rough road surface conditions above a threshold acting on the vehicle and trailer, and crosswind conditions above a threshold acting on the vehicle and trailer, to determine the quality indicator for the kinematic model.

15. The method of claim 14, further comprising:
fusing an HAA result from the USS process HAA and the kinematic model derived HAA with HAA results from multiple sensor modalities using a set of values which have been calculated for an HAA result and quality indicators which have been determined, wherein the multiple sensor modalities comprise at least vision, radar, and UWB modalities.

16. The method of claim 14, further comprising:
fusing an HAA result from the USS process HAA and associated quality indicator with HAA results from multiple sensor modalities and associated quality indicators, based on the kinematic model that is deemed low quality.

17. The method of claim 14, further comprising:
fusing the HAA result from the USS process HAA and associated quality indicator with HAA results from multiple sensor modalities and associated quality indicators and the kinematic model derived HAA and associated quality indicator, based on a kinematic model that is deemed high quality.

18. The method of claim 12, further comprising:
implementing the kinematic model for assessing the quality of USS process HAA results from the USS measurements at lower speeds, while the USS process HAA results are used to assess quality of the kinematic model in a set of trailer dynamic conditions comprising at least dynamics at higher speeds, at higher speeds with steering input, at rough road surface conditions above a threshold acting on the vehicle and trailer, and crosswind conditions above a threshold acting on the vehicle and trailer.

19. A vehicle apparatus, comprising a Hitch Articulation Angle (HAA) based on an estimation by an Ultra-Sonic Sensor's (USSs) estimation unit comprising one or more processors and non-transient computer-readable media encoded with programming instructions, the USSs estimation unit is configured to:
generate at least one set of Ultra-sonic Sensor (USS) data based on detecting at least one set of echo signals generated by a plurality of USSs configured about a vehicle that has been directed at a trailer wherein the trailer is coupled to the vehicle;
in response to detection of the at least one set of echo signals, filter based on at least one set of USS data based on plausibility filter assessments for quality of echo signals, and consistency with driving conditions including straight-ahead driving and steering inputs of echo signals;
in response to the filter of the at least one set of echo signals, estimate based on the at least one set of USS data by performing calculations using a selected set of geometric equations from one of a plurality of different sets of geometric equations in a plausibility filtering process to determine at least an arbitrary frontal shape of the trailer;
classify the estimated arbitrary frontal shape of the trailer based at least on a comparison of measured distances from detected echo signals about the trailer to a determined trailer frontal shape; and
generate at least one comparison based on at least one set of USS data estimated results to a kinematic model to ensure that results of the kinematic model to the HAA associated with the determined trailer frontal shape is deemed to have a higher signal performance wherein the higher signal performance is based on correlation with the kinematic model at low speeds.

20. The vehicle apparatus of claim 19, further comprising:
the USSs estimation unit is configured to:
implement the kinematic model for assessing the quality of USS process HAA results from the USS measurements at lower speeds, while the USS process HAA results are used to assess quality of the kinematic model in a set of trailer dynamic conditions comprising at least dynamics at higher speeds, at higher speeds with steering input, at rough road surface conditions above a threshold acting on the vehicle and trailer, and crosswind conditions above a threshold acting on the vehicle and trailer.

* * * * *